United States Patent [19]

Inazawa et al.

[11] Patent Number: 5,134,529
[45] Date of Patent: Jul. 28, 1992

[54] APPARATUS AND METHOD FOR RECORDING A DIGITAL SIGNAL

[75] Inventors: Yoshizumi Inazawa; Masaki Yamada; Shiya Ozaki; Tatsuya Iijima; Hiroshi Ishibashi, all of Kanagawa; Kentaro Odaka, Tokyo, all of Japan

[73] Assignee: Sony Corporation, Tokyo, Japan

[21] Appl. No.: 663,040

[22] Filed: Feb. 25, 1991

Related U.S. Application Data

[63] Continuation of Ser. No. 280,640, Dec. 6, 1988, abandoned.

[30] Foreign Application Priority Data

Dec. 14, 1987 [JP] Japan ............................... 62-315788
Dec. 14, 1987 [JP] Japan ............................... 62-315790
Dec. 14, 1987 [JP] Japan ............................... 62-315791

[51] Int. Cl.$^5$ .................................................. G11B 5/09
[52] U.S. Cl. ........................................ 360/48; 360/40
[58] Field of Search ........................................... 360/48

[56] References Cited

U.S. PATENT DOCUMENTS

| | | | |
|---|---|---|---|
| 3,261,003 | 7/1966 | Cogar et al. ............ | 360/53 |
| 3,439,344 | 4/1971 | Stanga . | |
| 3,740,720 | 6/1973 | Swaney . | |
| 4,357,638 | 2/1982 | Yoshimaru et al. ........... | 360/49 |
| 4,403,263 | 9/1983 | Kageyama et al. ........... | 360/32 |
| 4,445,195 | 4/1984 | Yamamoto ............... | 360/48 |
| 4,494,155 | 1/1985 | Veillard .................. | 360/47 |
| 4,559,568 | 12/1985 | Watanabe et al. ............ | 360/48 |
| 4,594,701 | 6/1986 | Earman et al. ............. | 360/72.1 |
| 4,620,239 | 10/1986 | Fujii ...................... | 360/8 |
| 4,622,600 | 11/1986 | Okamoro et al. ........... | 360/48 |
| 4,628,373 | 12/1986 | Takahashi et al. .......... | 360/32 |
| 4,656,532 | 4/1987 | Greenberg et al. .......... | 360/49 |
| 4,670,796 | 6/1987 | Kobayashi et al. .......... | 360/32 |
| 4,714,967 | 12/1987 | Bizjak .................... | 360/48 |
| 4,791,497 | 12/1988 | Nakano et al. ............ | 360/48 |
| 4,799,111 | 1/1989 | Ito ....................... | 360/32 |
| 4,805,042 | 2/1989 | Nishikata ................ | 360/49 |

FOREIGN PATENT DOCUMENTS

| | | |
|---|---|---|
| 0084952A2 | 8/1983 | European Pat. Off. . |
| 0203797 | 3/1986 | European Pat. Off. . |
| 0187029 | 9/1986 | European Pat. Off. . |
| 0272130A2 | 6/1988 | European Pat. Off. . |
| 0286412A3 | 10/1988 | European Pat. Off. . |
| 0314456A3 | 5/1989 | European Pat. Off. . |
| 3341363A1 | 5/1985 | Fed. Rep. of Germany . |
| WO80/01328 | 6/1980 | PCT Int'l Appl. . |
| 8809031 | 11/1988 | World Int. Prop. O. . |

OTHER PUBLICATIONS

Radio Fernsehen Elektronik, vol. 34, No. 9, Sep. 1985, Ost–Berlin, DDR, pp. 600–601: Guldner et al.: "Erweiterung des Betriebysystems UDOS 1526, zur Ansteuerung van Kassettenmagnetbandeinheiten."

IBM Technical Disclosure Bulletin, vol. 18, No. 6, Nov. 1975, New York, pp. 1726–1727; Lewis: "Serial Data Recording."

Electronics, vol. 45, No. 23, Nov. 6, 1972, New York, U.S., p. 36: "How to update tapes without recopying."

Primary Examiner—Vincent P. Canney
Attorney, Agent, or Firm—Philip M. Shaw, Jr.

[57] ABSTRACT

An apparatus and method for recording digital data employing a DAT (digital audio tape recorder) adapted to record the data from a computer or the like in accordance with the DAT format, wherein a unit is formed of predetermined plural frames and a signal indicative of each frame number within a unit and a signal indicative of the last frame of the unit are recorded with each frame, whereby the length of the unit can be arbitrarily changed and accordingly signal processing is facilitated easily.

4 Claims, 9 Drawing Sheets

FIG. 6A Even Block

FIG. 6B Odd Block

| PC1 | MSB 0 0 1 1 Pack No. | Format ID LSB |
|---|---|---|
| PC2 | Indefinite ||
| PC3 | Area ID | AFNO(MSB) |
| PC4 | AFNO ||
| PC5 | AFNO (LSB) ||
| PC6 | CD (Check Data)(MSB) ||
| PC7 | CD (LSB) ||
| PC8 | Parity ||

FIG. 9

| | | Continuity of AFNO ||
| | | OK | NG |
|---|---|---|---|
| Check Data | OK | (1) | (2) |
| | NG | (3) | (4) |

FIG. 10

| | A | B | C |
|---|---|---|---|
| (1) | Main Data OK | Error Main Data Drop-in | Error Main Data Drop-out |
| (2) | Error Main & Subdata Drop-in | do. | do. |
| (3) | Error Main Data Drop-in | do. | do. |
| (4) | Main Data OK Subdata Drop-in | do. | do. |
| (5) | Main Data OK Subdata Drop-out | do. | do. |

FIG. 12C

APPARATUS AND METHOD FOR RECORDING A DIGITAL SIGNAL

This is a continuation of co-pending application Ser. No. 280,640 filed on Dec. 6, 1988 now abandoned.

BACKGROUND OF THE INVENTION

1. Field of the Invention

The present invention relates to an apparatus and method for recording a digital signal, and more particularly to such an apparatus suitable for use in recording a digital signal transferred from a computer or the like.

2. Description of the Prior Art

Data stored in a hard disk or the like of a computer is, in practice transferred to and recorded by a data streamer (data-recorder) once a day so as to protect the data or back up the same.

For this operation or as a data recorder, analog audio tape recorders have been conventionally used in many cases. However, the analog tape recorders have disadvantages in that they need an excessive amount of a recording medium, e.g. magnetic tape, for recording and operate at a quite low data transferring rate upon recording, so that it takes a long time to transfer and record such data information. Moreover, the analog tape recorders have problems such as the starting point of a desired portion of the recorded data information cannot be rapidly searched for, and so on.

Thus, to overcome the above-mentioned problems, it is thought to utilize a helical-scan type DAT (digital audio tape recorder) using a rotary head, that is, a so-called DAT as a data recorder which has been recently comercialized. Such data recorders utilizing a DAT are described in U.S. patent application Ser. Nos. 133,010 filed Dec. 15, 1987, 177,624 filed Apr. 5, 1988, 210,229 filed Jun. 23, 1988 and 220,028 filed Jul. 15, 1988, by the same assignee of the present application.

To utilize the DAT as a data recorder, data transferred from a host computer is transformed in accordance with a DAT format before recording. In the DAT format, one frame is made up of two oblique tracks formed by one rotation of two heads respectively having a different azimuth angle with each other. 16-bit PCM audio data, which has been interleaved, and auxiliary sub-data are recorded in this one frame area as a unit. In this recording event, there are formed in each track a main area for recording the PCM data and a sub-area for recording the sub-data.

With the DAT as described above, when another signal is to be recorded on a previously recorded recording medium or tape, previously recorded signals are erased by recording new signals thereover, that is, by a so-called overwriting, without using an erasing head. Therefore, if overwriting is not normally effected, for example, due to clogging of the head or the like, there is the possibility that a part of the previously recorded signals will remain unerased. Therefore, if overwriting is not normally effected, for example, by the fact that a tape is momentarily loses contact with the heads or due to clogging, previously recorded signals may remain unerased, which causes a data error referred to as "drop-in".

To attend to this data error, in the DAT format, an error detecting code is added to each of the main areas and the sub-areas of each track in which signals are recorded, so as to detect an unerased portion, if any, in the track as an error.

When data from a computer is recorded in a data recorder, the signal processing will be facilitated if any period is known at every predetermined amount of the data.

OBJECTS AND SUMMARY OF THE INVENTION

In view of the foregoing, it is an object of the present invention to provide an apparatus for recording a digital signal which is capable of determining a data unit formed of a predetermined amount of data.

According to a first aspect of the present invention, there is provided an apparatus for recording a digital signal in tracks formed on a recording medium, comprising:

means for determining a unit formed of a plurality of tracks; and means for recording a signal indicative of the last track of the unit.

According to a second aspect of the present invention, there is provided a method for recording a digital signal in tracks formed on a recording medium, comprising the steps of:

determining a unit formed of a plurality of tracks; and recording a signal indicative of the last track of the unit.

The above and other objects, features and advantages of the present invention will become apparent from the following detailed description of the preferred embodiment taken in conjunction with the accompanying drawings, throughout which like reference numerals designate like elements and parts.

BRIEF DESCRIPTION OF THE DRAWINGS

FIG. 4, which is formed of two separate parts

DETAILED DESCRIPTION OF THE PREFERRED EMBODIMENT

One embodiment of the present invention will now be described with reference to the accompanying drawings.

Figure 1:
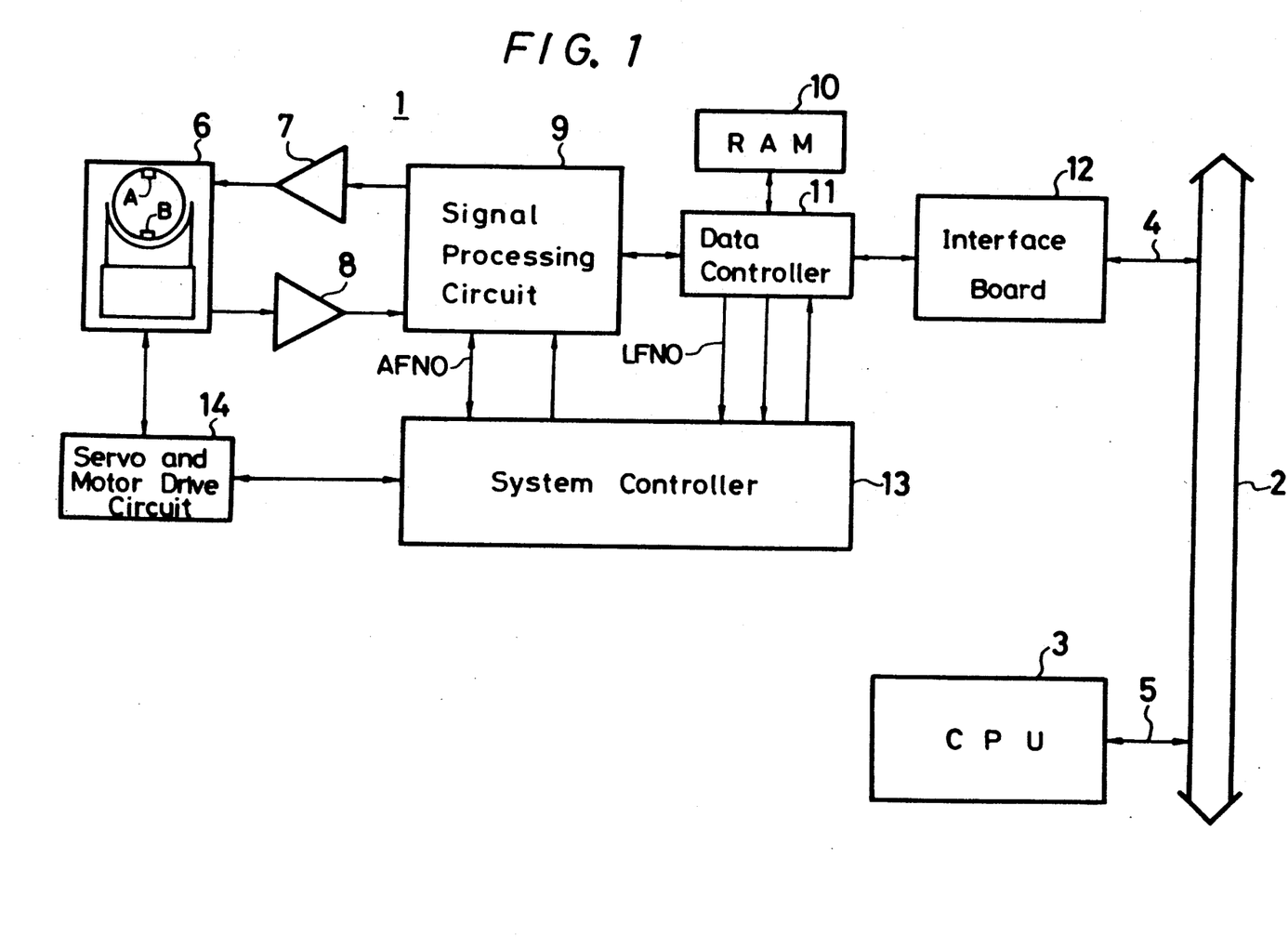
FIG. 1 is a block diagram showing an embodiment of the present invention.

FIG. 1 shows the whole arrangement of an embodiment according to the present invention in which a DAT is used as a data recorder. In FIG. 1 reference numeral 1 generally designates a DAT, 2 an interface bus, 3 a host computer, and 4, 5 inner buses, respectively. The DAT 1 is mainly formed of a recording and reproducing section 6, a recording amplifier 7, a reproducing amplifier 8, a signal processing circuit 9, a RAM 10, a data controller 11, an interface board 12, a system controller 13, a servo and motor drive circuit 14 and so on.

The system controller 13, the signal processing circuit 9 and the data controller 11 are arranged to interchange among them predetermined signals such as an absolute frame number AFNO, check data, a mode indication, a logical frame number LFNO, a determination result by the check data, a data transfer instruction and so on.

The recording and reproducing section 6 is provided with a rotary head drum, though not shown, such that a magnetic tape is wrapped around the peripheral surface of the drum over an angular range of about 90° of head travel and transported by a capstan. The drum is provided with heads A and B mounted thereon, respectively, having a different azimuth angle with each other, in a manner that two oblique tracks are recorded on and reproduced from a tape per one rotation of the drum by the heads.

Digital data delivered from the host computer 3 through the buses 5, 2 and 4 is fed to the interface board 12 through which the digital data is subjected to predetermined signal processings in the data controller 11, the RAM 10, the signal processing circuit 9 and so on under the control of the system controller 13 to be converted in accordance with aforementioned DAT format. The DAT formatted data is then supplied through the recording amplifier 7 to the recording and reproducing section 6 to be recorded on the magnetic tape by the heads A and B.

The signal recorded on the magnetic tape is reproduced by the heads A and B. The reproduced signal is supplied through the reproducing amplifier 8 to the signal processing circuit 9 wherein the signal is re-converted. The digital data therefrom is supplied through the data controller 11, the interface board 12 and the buses 4, 2 and 5 to the host computer 3.

Figure 2:
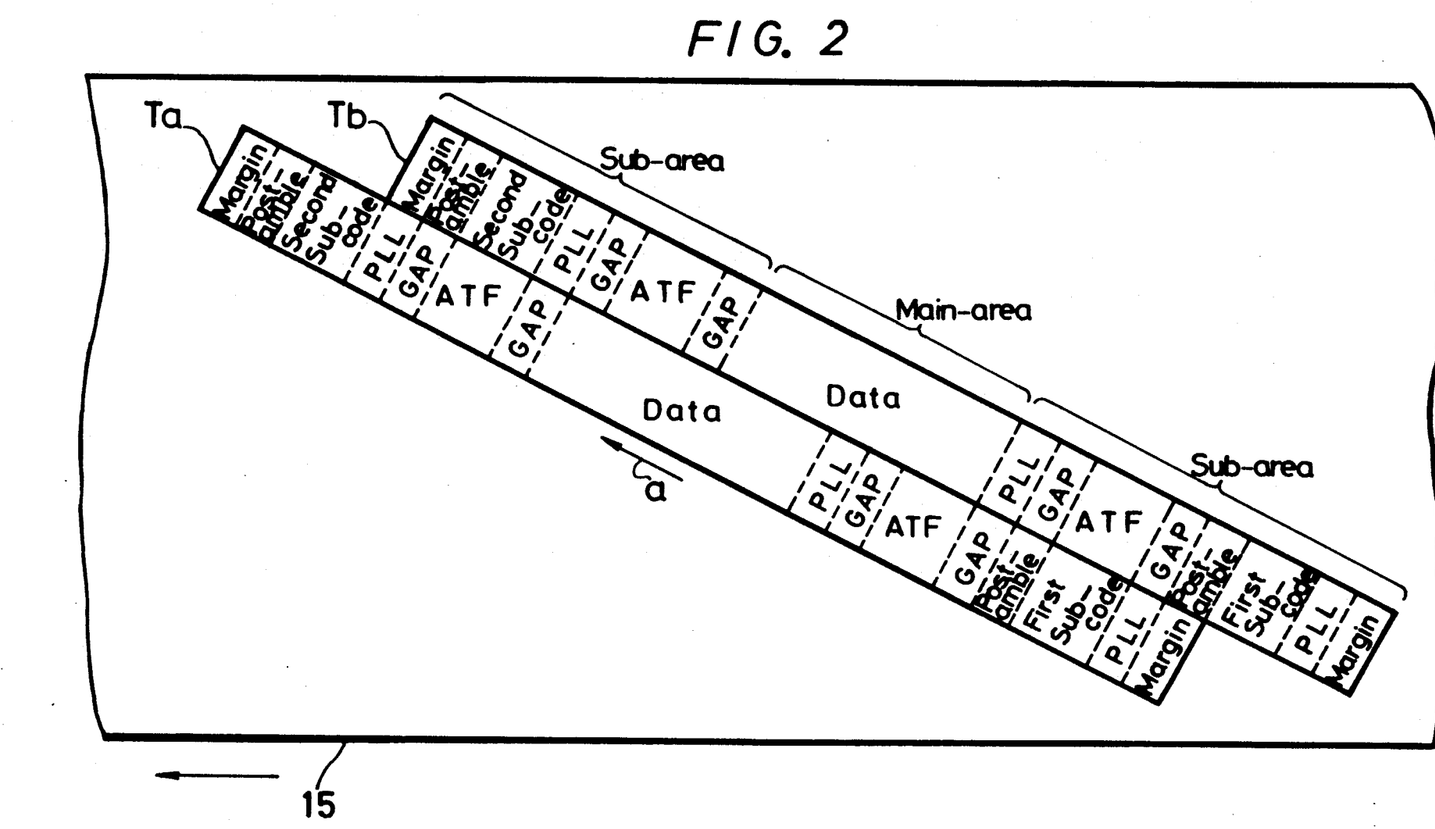
FIG. 2 is a diagram showing a DAT format.

In the above-mentioned apparatus, the DAT format according to which signals are recorded on a magnetic tape is as shown in FIG. 2.

In FIG. 2, two oblique tracks $T_A$ and $T_B$ are formed on a tape 15 by one rotation of the heads A and B from its lower side as indicated by an arrow a in FIG. 2. One frame is made up of these two tracks $T_A$ and $T_B$. One track $T_A$ or $T_B$ comprises 196 blocks and one block is formed of 288 bits. The respective 34 blocks at both end portions thereof are assigned to be the sub-areas and 128 blocks of the central portion thereof are designated as the main areas.

Figure 4A:
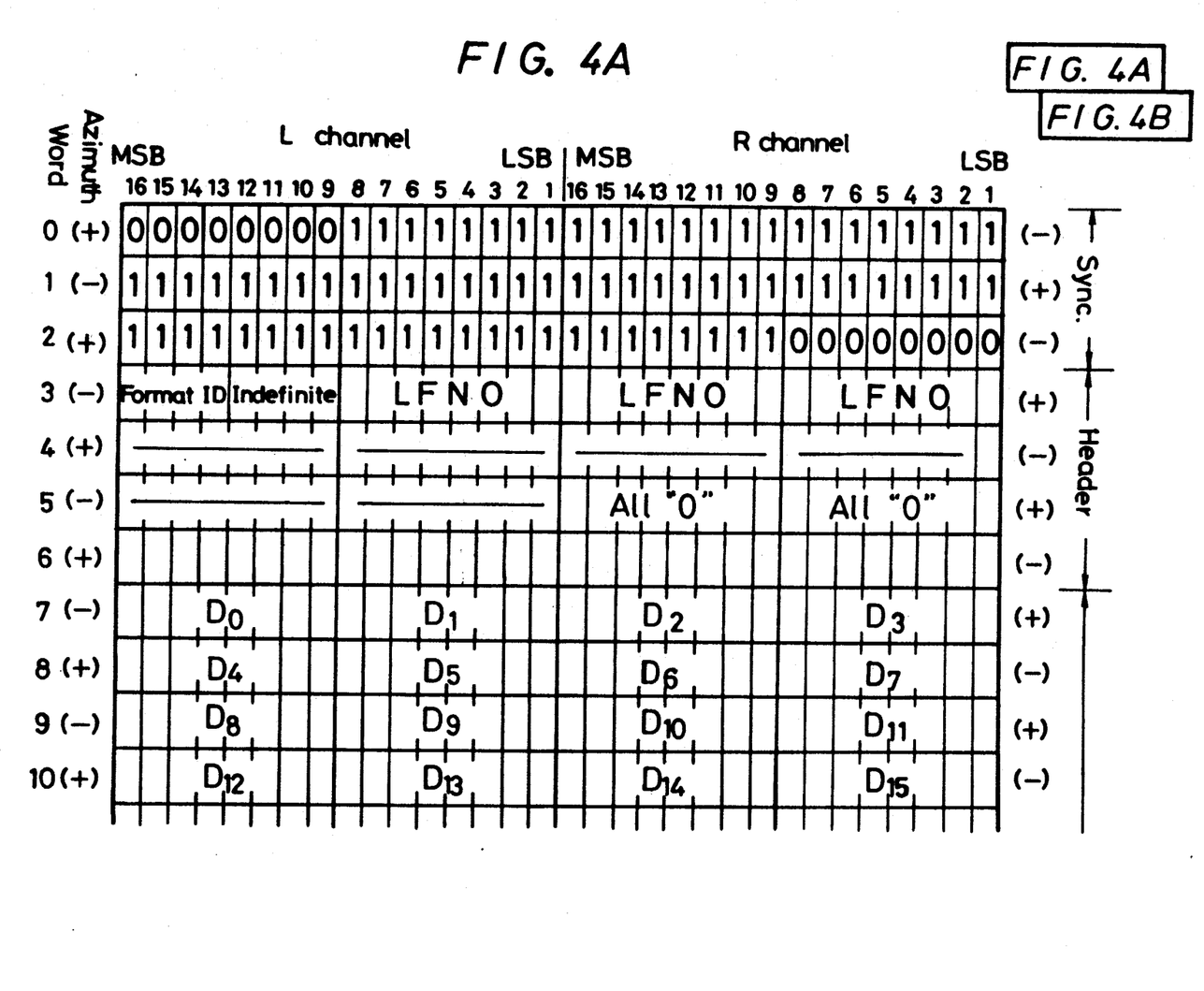
FIG. 4A and 4B, is a diagram showing the data format of the main area in one frame.
Figure 4B:
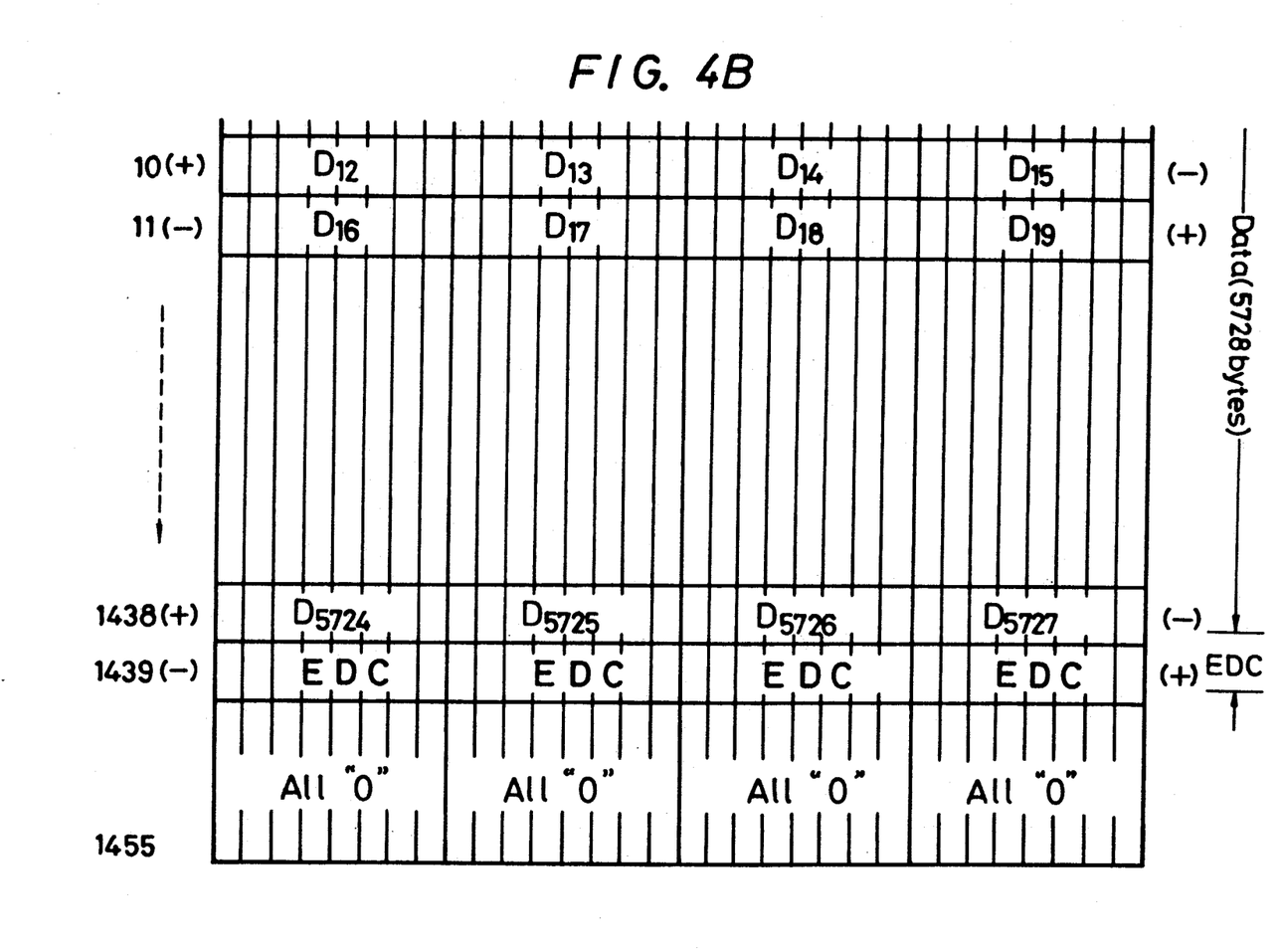

The sub-areas are further divided into several areas. Specifically, from the lower end side of each track, the sub-areas are partitioned into a margin area, a preamble area for the PLL of the sub-code, a first sub-code area, a postamble area, an interblock gap area, a tracking (ATF) signal area, an interblock gap area, a preamble area for the PLL of data, an interblock gap area, an AFT signal area, an interblock gap area, a preamble area for the PLL of the sub-code, a second sub-code area, a postamble area, and a margin area. Among these areas, the first and second sub-code areas are respectively formed of eight blocks, and the other areas are formed of a predetermined number of blocks. It should be noted that the scale of the respective areas in FIG. 4 is not exact.

Figure 3:
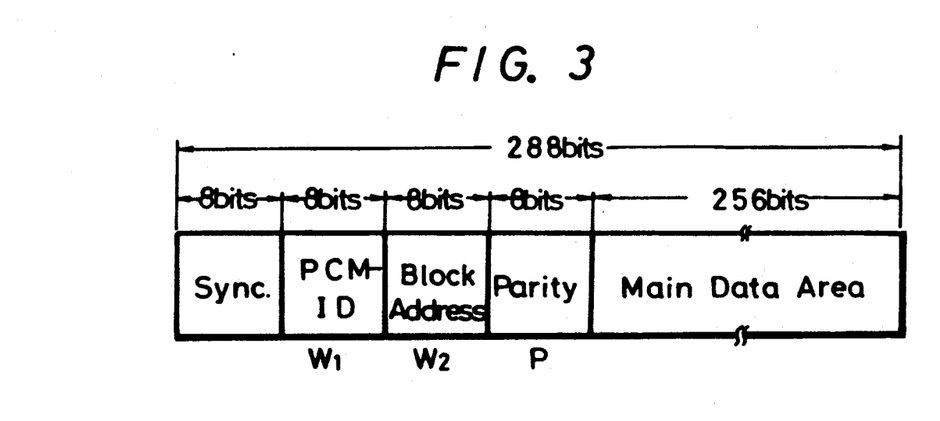
FIG. 3 is a diagram showing the data arrangement in the main data block.

The main area comprises 128 data blocks. Each of the blocks thereof comprises, as shown in FIG. 3, from its head, eight bits each of a synchronizing signal, a $W_1$ area for recording PCM-ID and so on, a block address area and a parity area and the remaining 256 bits of a main data area. When an audio signal is recorded, the main data area is loaded with a left (L) channel and a right (R) channel, each comprising 16 bit PCM data. The 16-bit PCM data are interleaved and recorded with parities in the main areas of the two tracks $T_A$ and $T_B$ (one frame). Thus, the main areas of one frame have a data capacity of approximately 5760 bytes. When the DAT is employed as a data recorder, the data transferred from the host computer 3 is converted into 16-bit data so as to be treated in the same manner as the above-mentioned audio PCM data and arranged in accordance with the format as shown in FIG. 4 and recorded in the main areas of one frame.

Let the above format be explained in more detail. In FIG. 4, the above-mentioned 5760 bytes are divided into words (0–1439) each formed of four bytes (32 bits). Each of these words is divided into a 16-bit (two bytes) R-channel and a L-channel in accordance with the DAT-formatted audio signal. The first three words (12 bytes) are assigned to be a synchronizing area in which all the bits of the first byte are set to "0", all the bits of the subsequent 10 bytes are set to "1", and all the bits of the last byte are set to "0".

The next four words (16 bytes) are assigned to be a header portion. Four bits at the MSB side in the former half byte of the third word of the L-channel in this header portion are assigned to be a format ID for indicating the format of the data recorder, and 4 bits in the latter of the same are indefinite. The remaining three bytes of the third word are assigned to be logical frame number (LFNO) areas. By the LFNO, each made of 8 bits there is provided a binary value indicative of the serial number 1-23 of a frame, wherein 23 frames are treated as a unit.

The seventh to 1438th words subsequent to the header portion are assigned to be a data area having a total capacity of 5728 bytes, and data signals from the host computer 3 are sequentially recorded in these frames by four bytes.

The 1439th word is assigned to an error detecting code (EDC) area in which is recorded an error detecting code (EDC) for each of the data bit suquences formed of the data signals written in the header portion and the data area in the vertical direction.

As described above, the DAT format of the present embodiment is such that L-channel data and R-channel data are alternately recorded by two bytes in two tracks, wherein each track is generally identified, for example, by plus and minus (+ and −) azimuth angles of the heads A and B for forming the tracks which are marked on the both sides of FIG. 4. The EDC can be generated for the two tracks forming one frame in the above-mentioned manner so that the EDC is generated for the data sequence formed of the data signals in the header portion and the data area in the vertical direction.

Therefore, according to this format, it is possible to determine whether there remain unerased portions or not by effecting the EDC operation. Specifically, if an unerased portion remains in one of the two tracks, every other data for generating the EDC is erroneous so that the EDC cannot be generated correctly. Thus, the unerased portion can be detected by checking the generated EDC values.

Figure 5:
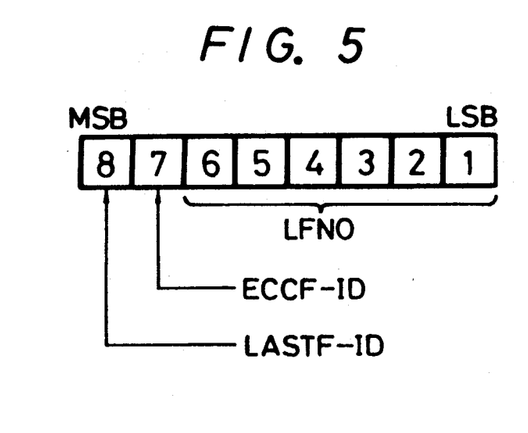
FIG. 5 is a diagram showing the data arrangement of the logical frame number.

Next, the logical frame number LFNO will be explained with reference to FIG. 5.

As described above, the logical frame number LFNO is assigned to record the serial number 1–23 of a frame, for example, with 23 frames being one unit. In other words, the frame numbers 1 to 23 repeat with every 23 frames. As illustrated in FIG. 5, the LFNO is formed of eight bits. The most significant bit of the LFNO is a last frame ID (LASTF-ID) indicative of the last frame in the unit, that is, the 23rd frame when the unit is formed of 23 frames. The next most significant bit is an ECC frame ID (ECCF-ID) indicative of an ECC frame for correcting errors. The remaining six bits represent the LFNO 1–23 in binary combination. The number of frames in one unit can be selected arbitrarily from the range of 1 to 64 in place of the above-mentioned 23 frames. In such case the last frame in one unit can be identified by the LASTF-ID. The ECCF-ID may be recorded in a plurality of frames, instead of recorded only in one frame.

The use of such unit provided with the LFNO can clearly delimit data by a predetermined quantity, and accordingly the signal processing is facilitated. Further, since the number of frames in one unit can be appropriately selected by changing the maximum value of the LFNO, the signal processing can be effected more easily. Furthermore, the data overwrite operation can be effected by using the LASTF-ID as described later.

Next, an explanation will be given of the data arrangement of the first and second sub-code portions in the sub-area.

The first and second sub-code portions are respectively formed of eight sub-code blocks in each one of which 2048 bits of data can be recorded.

Figure 6A:
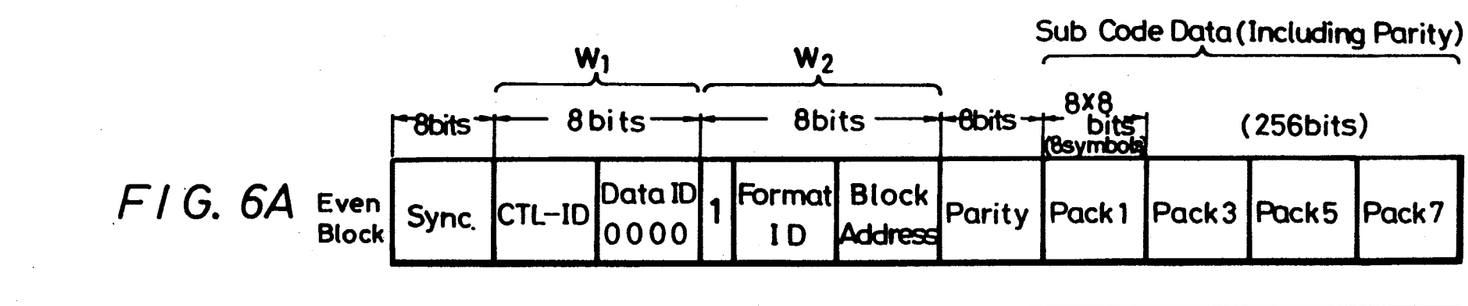
FIG. 6A and B are a diagram showing the data arrangement of the sub-code block.
Figure 6B:
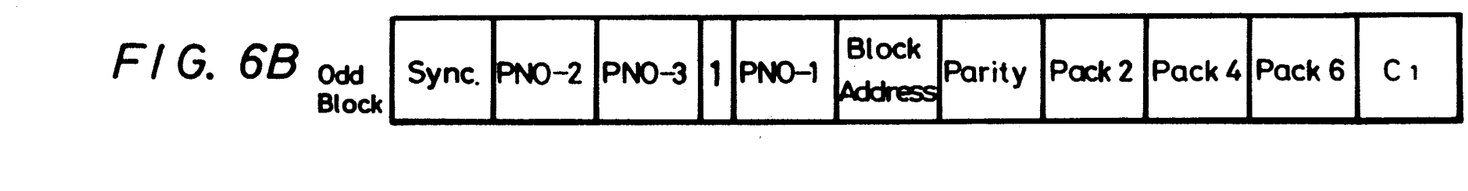

FIG. 6 shows the constructions of the even-numbered subcode block (EVEN block) and the odd-numbered sub-code block (ODD block), in each of which a synchronizing signal, the areas $W_1$ and $W_2$ and a parity, respectively formed of eight bits, and 256 bits of sub-code data including a parity are located in this order. The sub-code data is divided into four packs formed of 64 ($8 \times 8$) bits (eight symbols), respectively.

As shown in FIG. 6, the contents of $W_1$ and $W_2$ in the EVEN block are different from those in the ODD block, and the packs in the EVEN and ODD blocks are alternately numbered from "1" to "7". The eighth pack is assigned to record an error detecting code $C_1$.

In the EVEN block, the area $W_1$ consists of an ID area and a data ID area, respectively formed of four-bits, while the area $W_2$ consists of the upper one bit set at "1", a three-bit pack ID and a four-bit block address. On the other hand, in the ODD block, the area $W_1$ consists of a four-bit indefinite portion and a four-bit format ID, while the area $W_2$ consists of the upper one bit set at "1", the subsequent three bits all set at "0" and a four-bit block address. When the four-bit area ID in the area $W_1$ of the EVEN block is set at "0100", it is designated as an EOD-ID (end of data ID) which identifies the end of the tape.

The packs 1–7 are respectively divided into eight words of eight bits in which are recorded a variety of codes such as a code indicating the lead-in area of the record starting portion on a tape, a code indicating a lead-out area of the record terminating portion, a code indicating the recording date, an absolute frame number, a logical frame number and so on, with parities.

Figure 7:
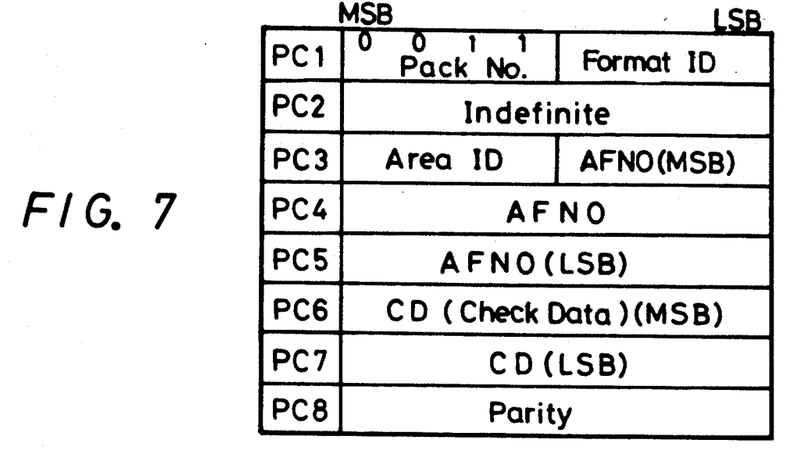
FIG. 7 is a diagram showing the data arrangement of the packs in the sub-code block.

FIG. 7 shows the construction of the pack 3 as an example of one of these seven packs.

As can be seen from FIG. 7, the pack 3 consists of eight of eight-bit words PC1–PC8. The upper four bits of the word PC1 are assigned to record a pack number ("0011" indicating the pack 3 in FIG. 7), and the lower four bits of the same a format ID. The word PC2 is indefinite. The upper four bits of the word PC3 are assigned to record an area ID indicative of the lead-in area or the lead-out area. A total 20 bit area formed of the lower four bits of the word PC3 and the words PC4 and PC5 is assigned to record the absolute frame number (AFNO). The AFNO is the serial number recorded in each corresponding frame in one volume of tape. A total 16-bit area formed of the subsequent words PC6 and PC7 is assigned to record a check data CD which relates to the present invention. The word PC8 is assigned to record a parity for the words PC1–PC7.

The above 16-bit check data CD is the exclusive OR of all the data (transferred from the host computer 3) recorded in the main area located in one of the tracks $T_A$ and $T_B$ in which the pack 3 is provided. Alternatively, the check data CD may be an error detecting signal such as CRC for all the data recorded in the main area.

$$\text{Check Data}(+\text{azimuth}) = L0 + R1 + L2 + R3 + \ldots + R1439$$

$$\text{Check Data}(-\text{azimuth}) = R0 + L1 + R2 + L3 + \ldots + L1439$$

The check data may be recorded in superimposed fashion in the word PC1 and other indefinite portions in the words PC2–PC7 to improve the reliability of data. In this case, since one track has eight blocks each of the first and second sub-code portions and there are seven packs available in a pair of EVEN and ODD blocks, it is possible to record maximally 56 sets of the check data CD in one track.

The check data is utilized in the following occasions.

Upon reproduction, the check data read out from one track is compared with the exclusive OR of main data read out from the main portion of the same track. If, as the result of this comparison, both data do not coincide with each other, it can be determined that the whole main area or the whole sub-area remains unerased (previously recorded check data CD also remains). On the other hand, if both data coincide with each other, it can be determined that the whole main area and the whole sub-area are both correct or that both are erroneous. Next, it can be detected which of the main area and the sub-area is erroneous by the use of the LFNO and AFNO in the following manner.

Figure 8:
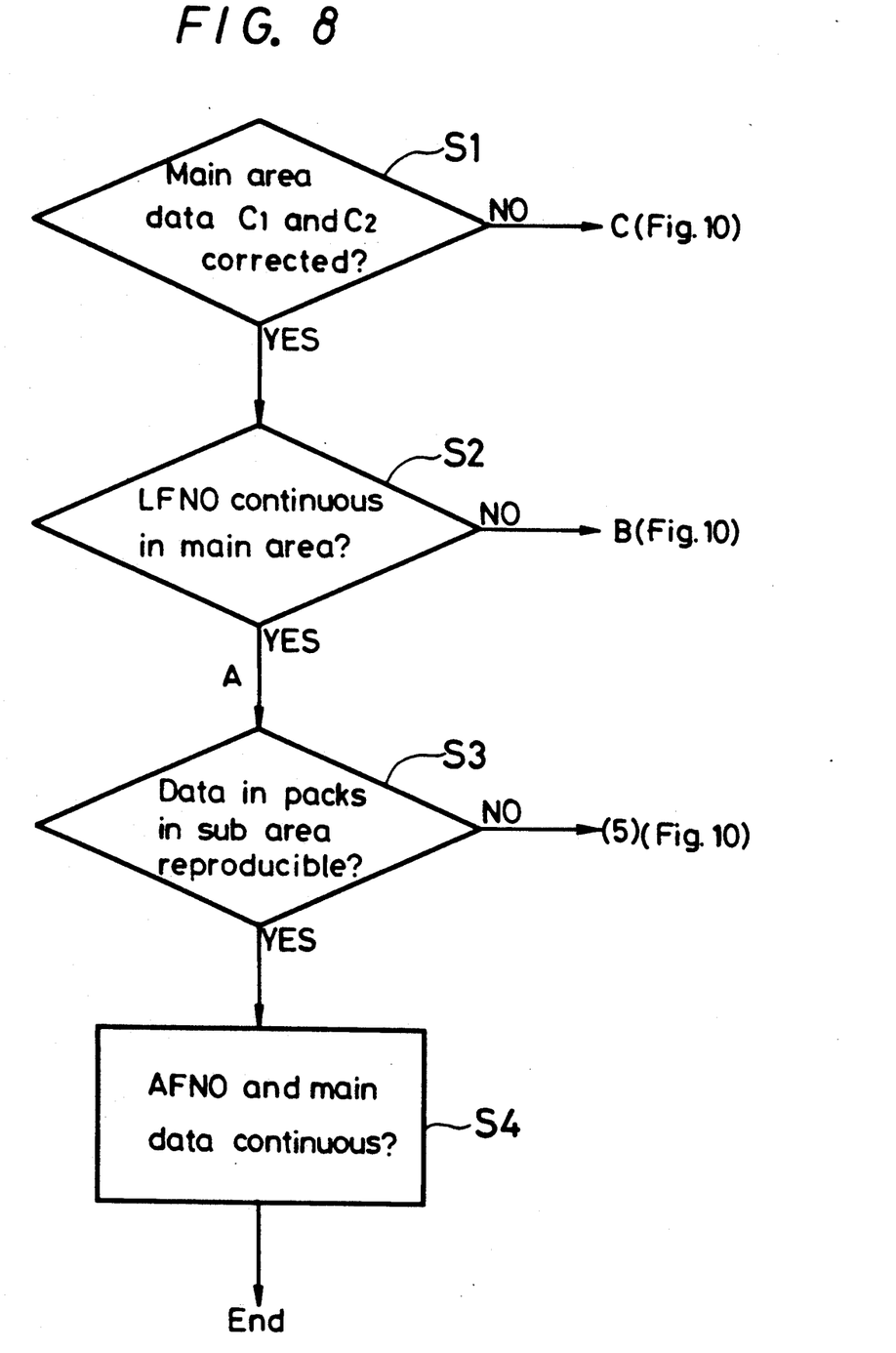
FIG. 8 is a flowchart showing a sequence of the error determinating method.
Figure 9:
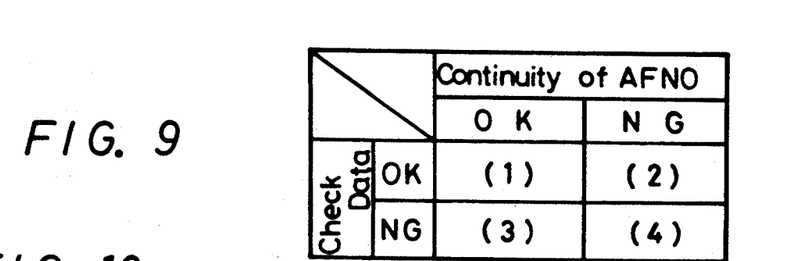
FIG. 9 is a table showing error determination bases.
Figure 10:
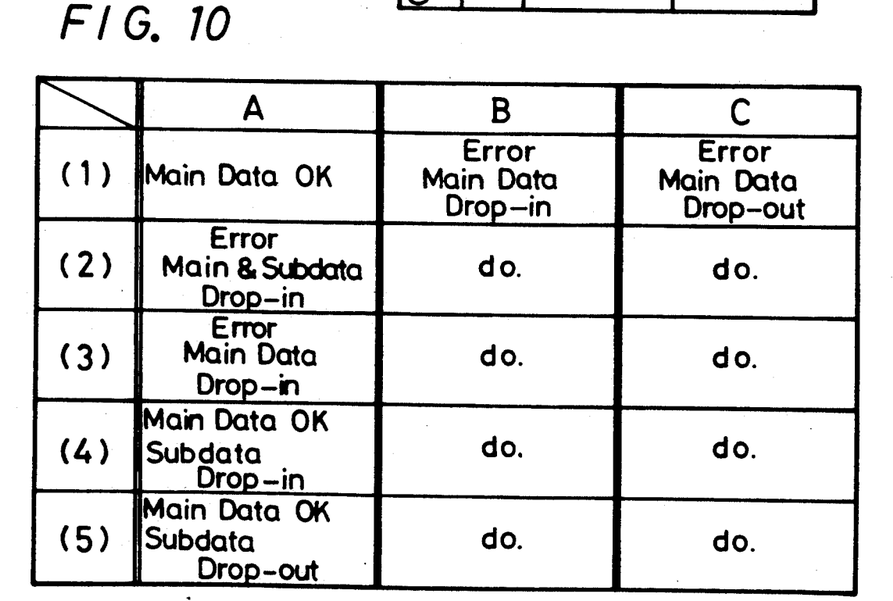
FIG. 10 is a table showing contents of respective determinations.

FIG. 8 shows a sequence of such determination, wherein respective checking items at steps S1–S4 provide determination bases as shown in FIG. 9, from which errors can be defined as shown in FIG. 10.

In FIG. 8, it is first examined at step S1 whether or not data recorded in the main area (hereinafter simply called "the main data") was corrected by the codes $C_1$ and $C_2$. If the correction was not possible, it is determined on the basis of the column C in FIG. 10 that there is a drop-out in the main data on the track, and a message indicative of the determination is transferred.

If it is detected at step S1 that the correction was carried out, the process proceeds to the next step S2 to examine the continuity of the LFNO in the main area. If continuity is not found, it is determined on the basis of column B in FIG. 10 that the overwrite was not correctly effected and hence unerased signals, which had been previously recorded, are reproduced, that is, a drop-in occurred in the concerned track, and a massage indicative of the determination is transferred.

If continuity is found in the LFNO, the process terminates the check on the main area and proceeds to the next step S3 to check the sub-area. Specifically, the reproducibility of data in the packs of the sub-area is examined by the the error correcting code $C_1$, the parities recorded in the packs, coincidence of data and so on. If these checks cannot be effected, it is determined on the basis of the row (5) in FIG. 10 that a drop-out occurred in data in the sub-area (sub-data) and the main data is correct.

If the reproducibility check has been effected, the process proceeds to the next step S4 wherein the continuity of the AFNO and the main data are checked, the latter by the use of the check data CD, and the determination bases shown in FIG. 9 are provided from the respective check results. Thus, the determinations in the column A of FIG. 10 can be obtained from the bases of FIG. 9.

The contents of respective determination are as follows:

A - (1) ... The main data is correct.
A - (2) ... Drop-in occurred in both of the main data and sub-data.
A - (3) ... Drop-in occurred in the main data. The AFNO was continuous eventually.
A - (4) ... Drop-in occurred in the sub-data. The AFNO is made to self-run and the main data is regarded to be correct.
A - (5) ... Drop-out occurred in the sub-data. The AFNO is made to self-run and the main data is regarded to be correct.

Incidentally, a flag may be generated when the drop-in is detected by the check data CD, whereby the error correction can be effected by an error correction code ECC on the basis of this flag. Also, the above-mentioned error detection by the check data CD may be effected many times to prevent mis-reading of the check data CD and data in the main area.

According to the present invention, the predetermined amount of data can be clearly delimited by the unit. The LFNO can be arbitrarily selected from the range of 1 to 64 to change the above-mentioned predetermined amount of data, that is, the unit length, thereby making it possible to facilitate the data processing. Further, the last frame of each unit can be detected by the LASTF-ID.

Next, a method of the overwrite operation will be explained with reference to FIGS. 11A and 11B.

Figures 11A, 11B:
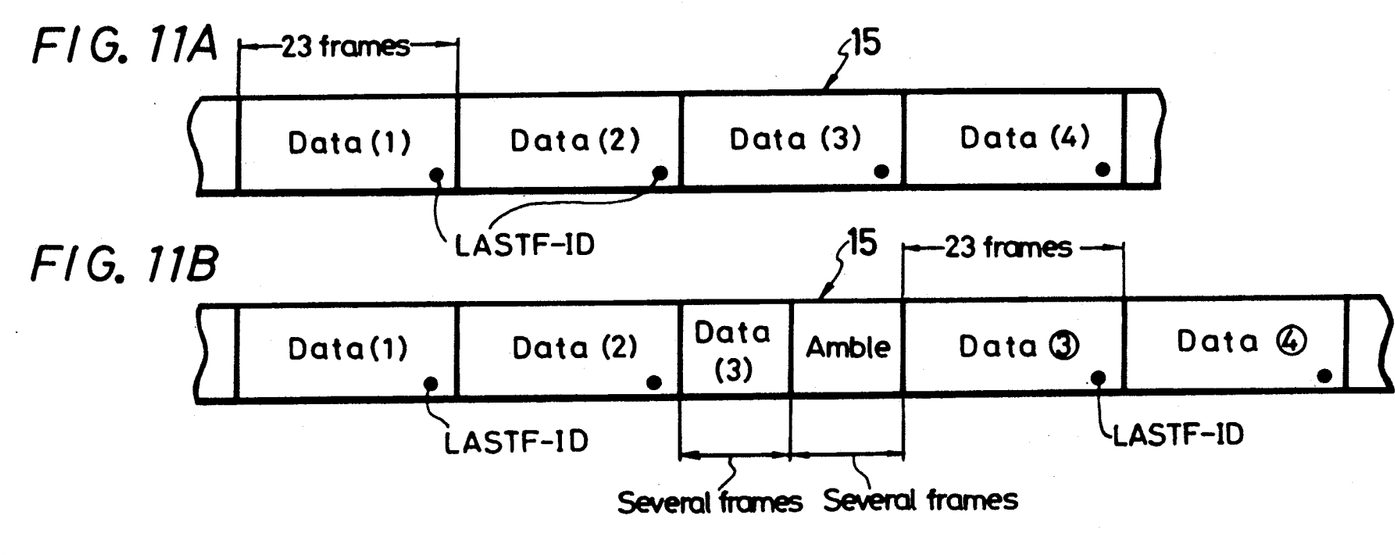
FIGS. 11A and 11B are diagrams used to explain the overwrite operation according to the present invention.

In FIG. 11A, data (1), (2), (3), (4)... are recorded on the tape 15 at every data unit. In this case, there is not provided the amble portion between the adjacent units so that the units are located adjacent to each other. In the present embodiment, one unit is assumed to be formed of 23 frames, and the aforementioned LASTF-ID is recorded in the 23rd frame of each unit.

When new data is overwritten from the data (3) on the tape 15, as shown in FIG. 11B, the LASTF-ID in the data (2) is first detected. Within one to ten frames after the detection of the LASTF-ID, the amble portion is recorded in several frames of the main area. Then, after the amble portion, new data ③, ④ ... are adjacently recorded unit by unit. In this event, the LASTF-ID is also recorded in each of the units.

When the tape 15 on which the data has been overwritten as described above and shown in FIG. 11B is reproduced, the data (1), (2) and (3) are successively read out. However, since the amble portion is reproduced in the middle of the data (3), it is understood that this data (3) may be removed. The data ③, ④ ... read out subsequent to the amble portion of the data (3) are taken in as effective data.

As described above, since it is not necessary to record the amble portion, unlike the prior art when the first data (1), (2), (3), (4) ... are recorded on the tape 15, the data transfer rate as well as the recording capacity of the tape 15 upon recording will never be decreased. Also, when the overwrite operation is effected, only a portion of the previously recorded data (3) and only several frames of the amble portion are formed before the head position of the data ③ which is recorded first in the overwrite operation, so that neither the transfer rate nor the recording capacity of the tape is largely decreased. It is further possible to protect data located near the append point from being destroyed.

It will therefore be understood that data can be overwritten without decreasing the data transfer rate or the recording capacity of the recording medium.

Next, a data erasing method according to the present embodiment will be explained with reference to FIGS. 12A, 12B and 12C.

Figure 12A:
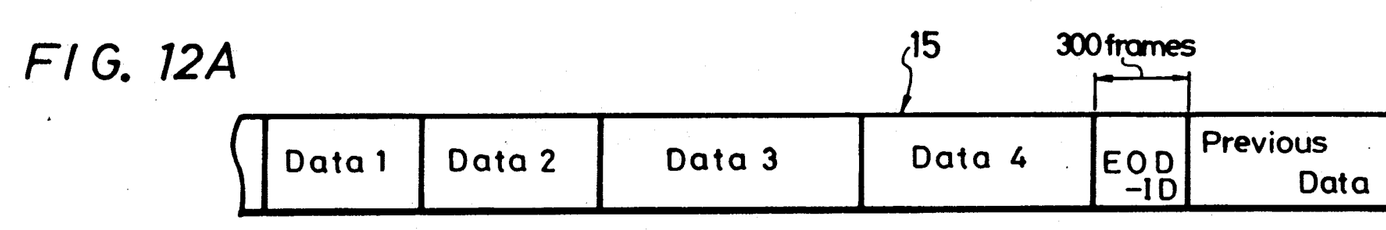
FIGS. 12A, 12B and 12C are diagrams used to explain the erasing methods according to the present invention.

FIG. 12A illustrates a recording pattern formed on the tape 15 before a data erasure. As can be seen from FIG. 12A, one backup operation was effected to record the data 1-4 and 300 frames of the aforementioned EOD-ID (see FIG. 6) after the end of the data 4, while previously recorded data remain subsequent to the EOD-ID.

Assume in the tape 15 of FIG. 12A, for example, that the recorded data 1 and 2 are maintained and the data recorded after the data 3 are to be erased. Consider the following two operations for such erasure:

(1) erasure indicating that all the data recorded after the data 3 is unnecessary (hereinafter referred to as "unnecessity erasure"); and (2) erasing all the data recorded after the data area 3 (hereinafter referred to as "complete erasure").

A first command signal is transferred from the host computer when it is not necessary to erase, while a second command signal is transferred from the host computer when the complete erasure is required.

These two operations will hereinafter be explained in detail with reference to FIGS. 12B and 12C.

(1) Erasure not necessary

Figure 12B:
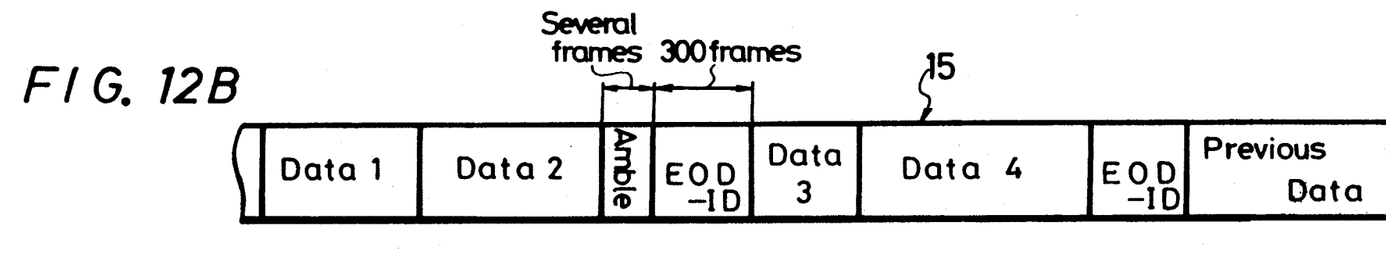

When the data recorder receives the first command signal, as shown in FIG. 12B, one to two frames or several frames of the amble portion are formed at the head of the data 3. The amble portion is formed of dummy data, for example, all set to "0" or the like. Next, the aforementioned EOD-ID is recorded in the sub-area over 300 frames of area.

Thus, when the tape 15 shown in FIG. 12B is reproduced, the amble portion is first detected, and next the EOD-ID is detected, whereby it can be understood that a portion of the data 3 subsequent to the EOD-ID and all the data thereafter are all unnecessary.

(2) Complete erasure

Figure 12C:
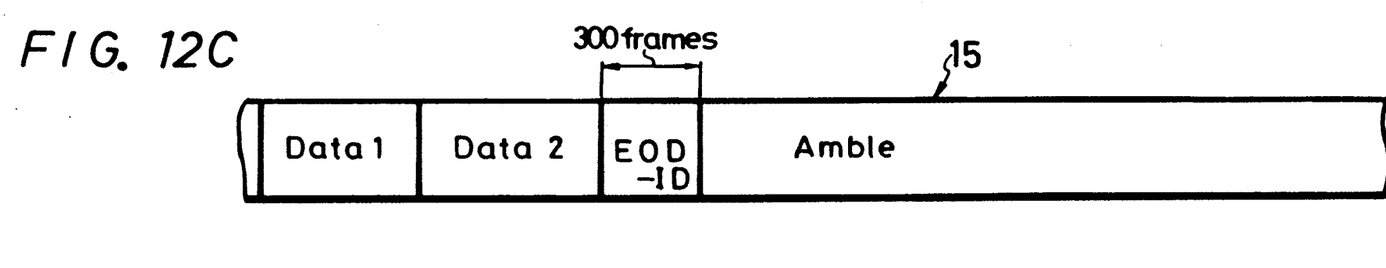

When the second command signal is generated, the EOD-ID is first recorded in 300 frames of the head portion of the data 3 and subsequent thereto the amble portion is formed in all the remaining areas, as shown in FIG. 12C. Several frames of the amble portion can be formed before the EOD-ID recorded in the data 3.

When the tape 15 of FIG. 12C is reproduced, the EOD-ID is detected and next the amble portion is detected, whereby it can be understood that the data subsequent to the EOD-ID has been erased.

The amble portion is formed of the aforementioned LFNO whose constituent bits are all set at "0" or the aforementioned AFNO and the check data CD whose constituent bits are all set at "0", or the both.

According to the above described erasing method, the contents of the erasing operations upon erasure can be distinguished by the first and second command signals and the contents of erasure can be detected by examining the recorded pattern formed upon reproduction. It is further possible according to the erasing method to substantially invalidate the written data without destroying the DAT format and without using an erasing head.

As described above, since the signal such as the EOD-ID or the like which substantially invalidate the data recorded subsequent thereto is recorded in a predetermined position of the sub-area, the main area or the like of the data format in accordance with the erasing command signal, the data can be substantially erased without using the erasing head while the predetermined data format such as the DAT format or the like is maintained.

The above description is given on preferred embodiments of the invention but it will be apparent that many modifications and variations could be effected by one skilled in the art without departing from the spirits or scope of the novel concepts of the invention so that the scope of the invention should be determined by the appended claims only.

We claim as our invention:

1. An apparatus for recording a digital signal in tracks formed on a recording medium, comprising:
   means for determining a unit comprising less than the entire recording medium and formed of a plurality of tracks;
   means for recording a signal indicative of the last track of the unit in the last track of the unit;
   means for detecting said signal indicative of the last track of the unit; and
   means for overwriting a digital signal on the basis of the detection.

2. An apparatus for recording a digital signal in tracks formed on a recording medium, comprising:
   means for determining a unit formed of a plurality of tracks;
   means for recording a signal indicative of the last track of the unit in the last track of the unit; and
   wherein adjacent units of data are initially recorded on the medium adjacent to each other, and further including means for first detecting the signal indicative of the last track of the unit prior to overwriting data in the unit and means for recording an amble signal within a predetermined number of frames after detection of the signal indicative of the last track of the unit prior to over writing the digital signal, wherein upon reproduction of the signals recorded on the medium the amble signal is indicative of a data unit which does not need to be reproduced.

3. A method for recording a digital signal in tracks formed on a recording medium, comprising the steps of:
   determining a unit comprising less than the entire recording medium and formed of a plurality of tracks;
   recording a signal indicative of the last track of the unit in the last track of the unit;
   detecting said signal indicative of the last track of the unit; and
   overwriting a digital signal on the basis of the detection.

4. A method for recording a digital signal in tracks formed on a recording medium using a rotary head type tape recorder, comprising the steps of:
   determining a unit formed of a plurality of tracks;
   recording a signal indicative of the last track of the unit; and
   wherein adjacent units of data are initially recorded on the medium adjacent to each other, and further including the step of first detecting the signal indicative of the last track of the unit prior to overwriting data in the unit and recording an amble signal within a predetermined number of frames after detection of the signal indicative of the last track of the unit prior to overwriting the digital signal, wherein upon reproduction of the signals recorded on the medium the amble signal is indicative of a data unit which does not need to be reproduced.

* * * * *